Feb. 11, 1947.  W. S. LITTLE  2,415,433
CELESTIAL NAVIGATION INSTRUMENT
Filed May 30, 1944  4 Sheets-Sheet 1
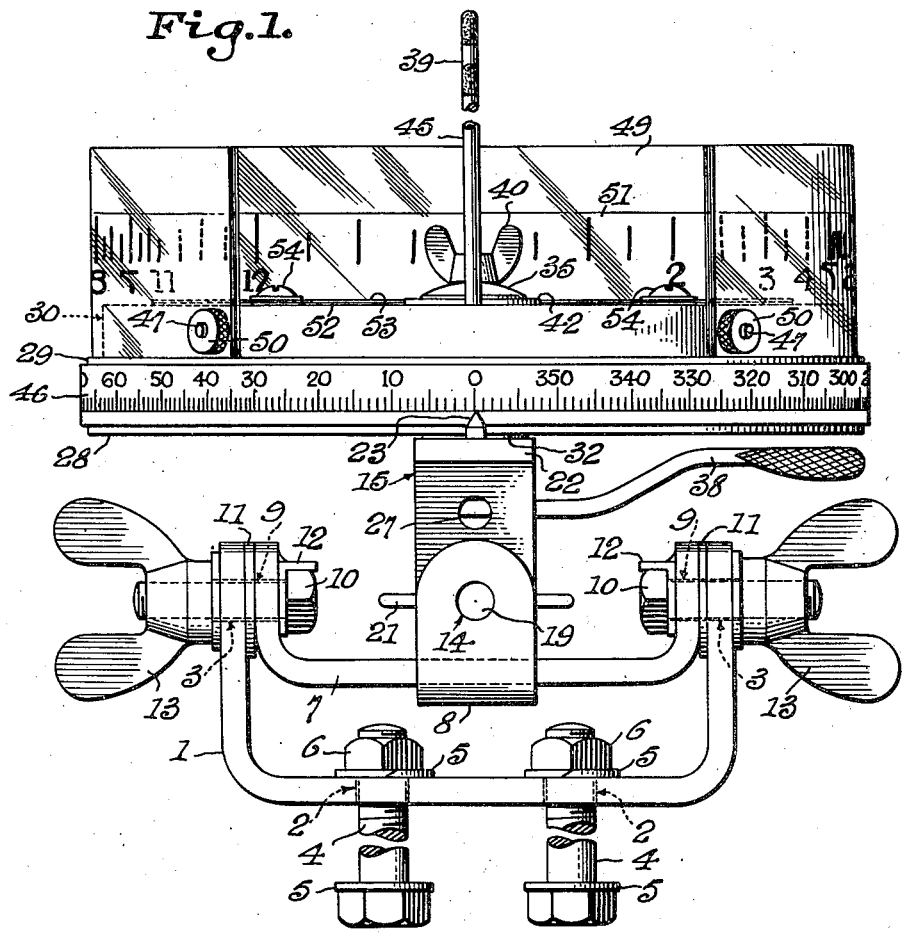
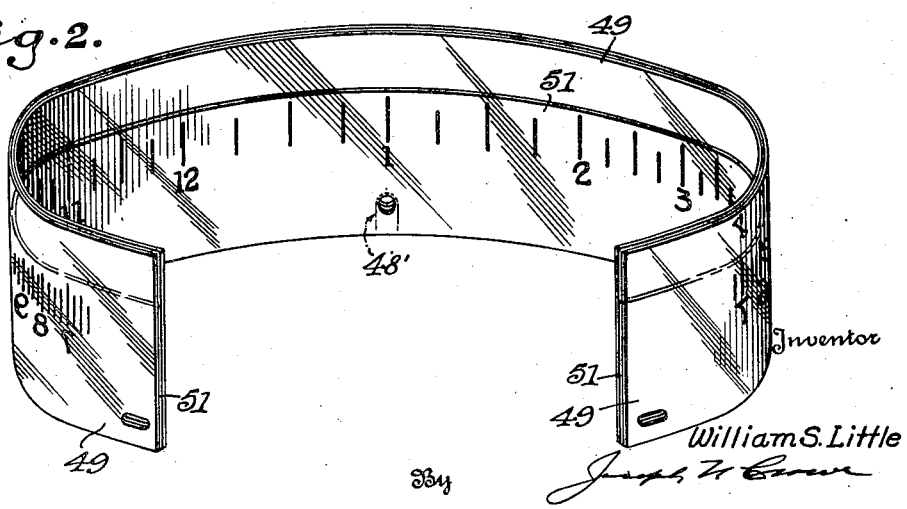
Inventor
William S. Little
By
Attorney

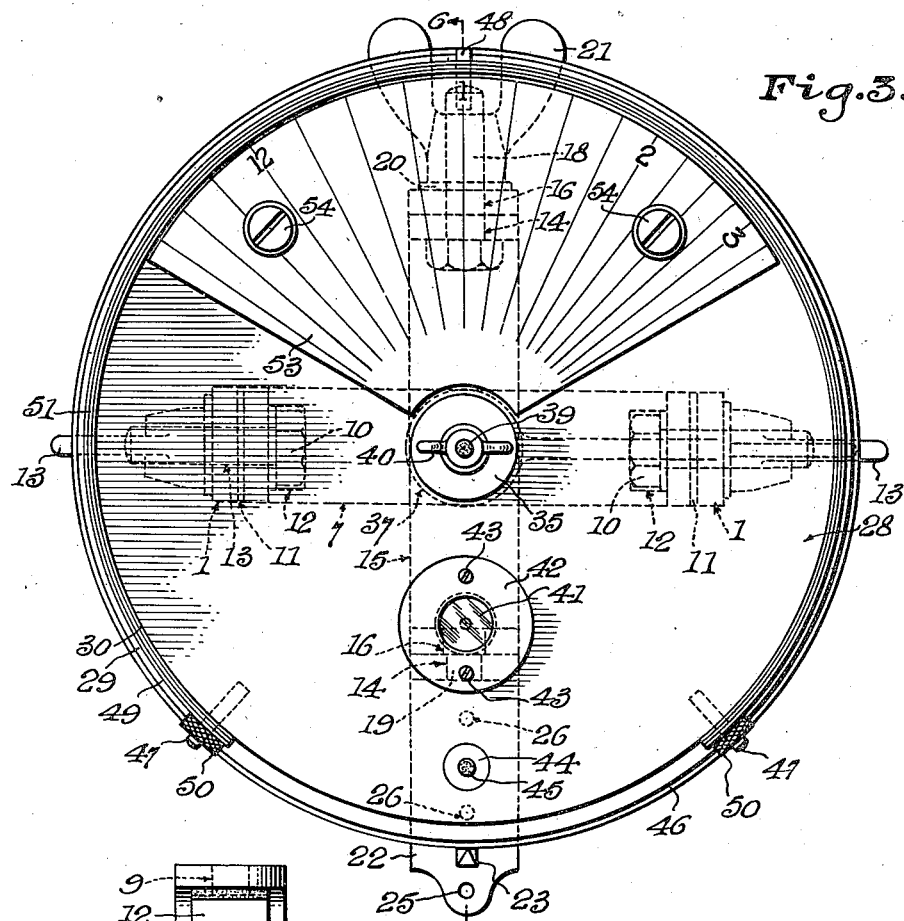
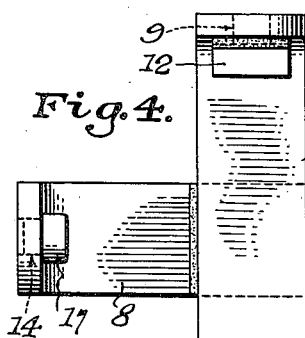
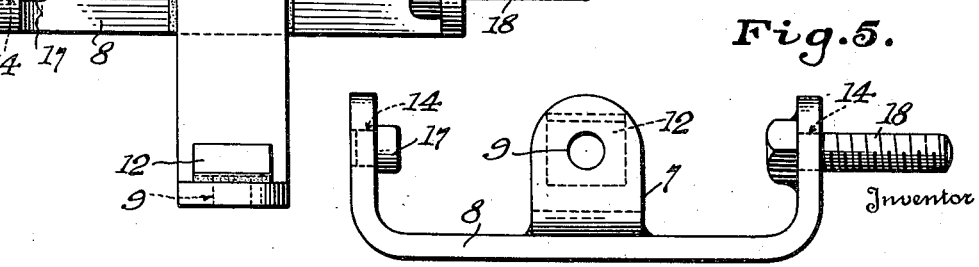

Feb. 11, 1947.  W. S. LITTLE  2,415,433
CELESTIAL NAVIGATION INSTRUMENT
Filed May 30, 1944  4 Sheets-Sheet 3

Inventor
William S. Little
By
Attorney

Feb. 11, 1947.  W. S. LITTLE  2,415,433
CELESTIAL NAVIGATION INSTRUMENT
Filed May 30, 1944  4 Sheets-Sheet 4

Inventor
William S. Little
By
Attorney

Patented Feb. 11, 1947

2,415,433

UNITED STATES PATENT OFFICE 2,415,433

CELESTIAL NAVIGATION INSTRUMENT

William S. Little, United States Army, Fort Belvoir, Va.

Application May 30, 1944, Serial No. 538,083

9 Claims. (Cl. 33—61)

(Granted under the act of March 3, 1883, as amended April 30, 1928; 370 O. G. 757)

The invention described herein may be manufactured and used by or for the Government for governmental purposes, without payment to me of any royalty thereon.

This invention relates to navigation instruments and more particularly to instruments which may be referred to astral bodies to determine geographical bearings.

It is an object of this invention to provide an instrument which is suitable for reconnaissance over any accessible terrain.

Another object of this invention is to provide an instrument which is suitable for conducting preliminary surveys rapidly to establish the location of roads, streams and other features of the terrain.

Still another object of this invention is to provide an instrument which may be used for establishing a desired course rapidly on any accessible terrain from either magnetic or true azimuths.

A further object of this invention is to provide an instrument which functions on local watch time and which may be referred to the sun or the North Star to establish a desired course from known magnetic or true azimuths or to determine the azimuths of traverses between a plurality of stations on accessible terrain.

A still further object of this invention is to provide a surveying instrument which may be mounted on a vehicle and is adapted to be observed by an occupant of the vehicle near or slightly below eye-level from the passenger compartment.

Other objects will be apparent from the following description of the invention and the accompanying drawings in which:

Figure 1 is a front elevational view of one form of the surveying instrument contemplated by this invention, showing the instrument completely assembled;

Figure 2 is a perspective view of the transparent protector strips which are adapted to support a time graduated scale in a vertical position with respect to the instrument;

Figure 3 is a top plan view of Figure 1;

Figure 4 is a top plan view of the middle yokes of the adjustable support for the instrument;

Figure 5 is a side elevational view of the element shown in Figure 4;

Figure 6:
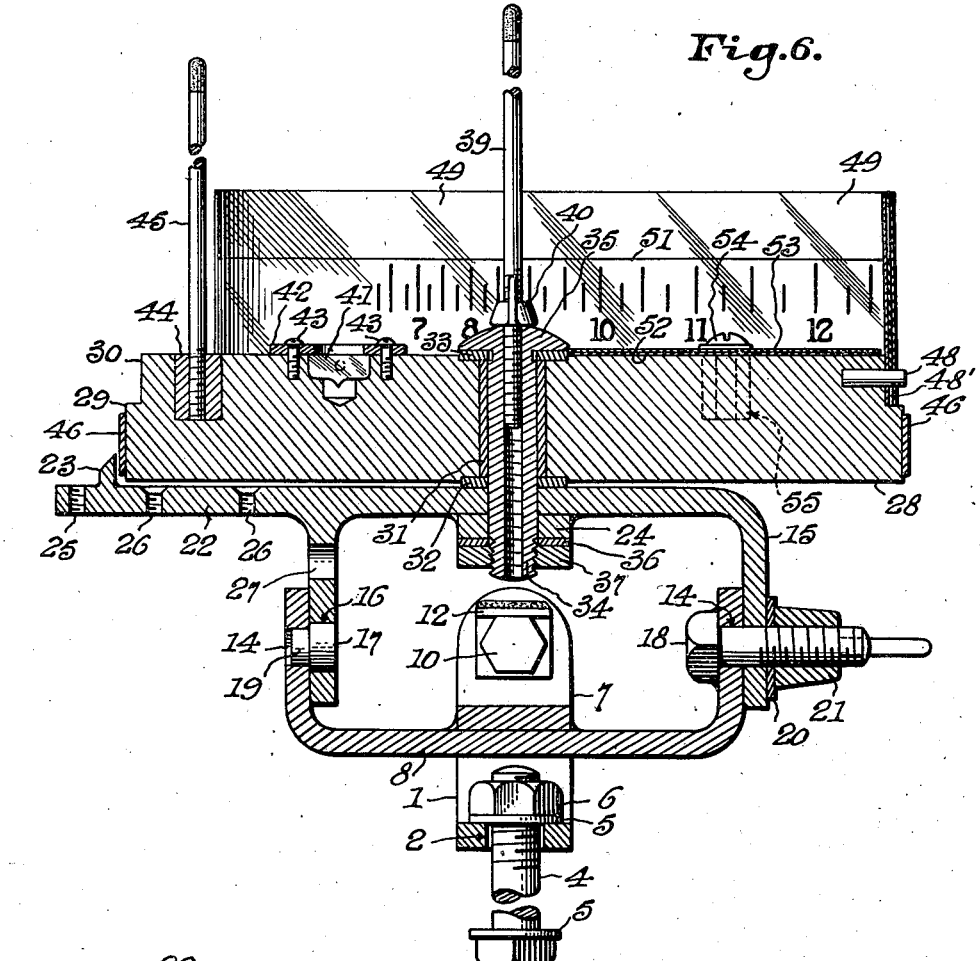
Figure 6 is a side elevational view of the instrument in cross-section taken along the line 6—6 of Figure 3.
Figure 7:
Figure 7 is a top plan view of the uppermost yoke of the instrument support.
Figure 8:
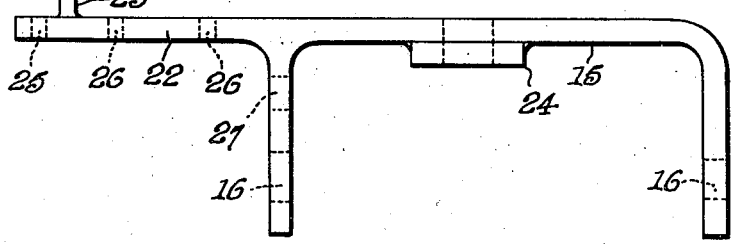
Figure 8 is a side elevational view of the element shown in Figure 7.

Referring to the foregoing figures and more particularly to Figure 1 and Figure 3, the surveying instrument contemplated by this invention is provided with an adjustable support for the purpose of leveling the instrument with respect to the terrain. The adjustable support comprises a plurality of pivotally connected yokes, of which the lowermost yoke 1 is adapted to rest upon a base such as, the engine hood of a motor vehicle. The horizontal portion of the yoke 1 is provided with the openings 2—2 and the vertical members thereof with the openings 3—3. A pair of bolts 4—4, provided with the washer sets 5 and the nuts 6—6, are adapted to pass through the openings 2—2 and corresponding openings in the base and thus secure the adjustable support to the base when the nuts 6—6 are tightened. A middle yoke consisting of a pair of transversely arranged yokes 7 and 8 which are welded or immovably secured together by other suitable means, is suspended between the vertical members of the yoke 1. The vertical members of the yoke 7 are provided with openings 9—9 which register with the openings 3—3 in the vertical members of the yoke 1. A pair of bolts 10—10 are adapted to pass through the openings 3—3 and 9—9 in the vertical members of the yokes 1 and 7 and the washers 11 positioned between these yokes. The inner faces of the vertical members of the yoke 7 have the flanged bolt locks 12—12 welded thereto or formed on the yoke. The flanged bolt locks 12—12 are adapted to engage a side of the head of each of the bolts 10—10 and thus prevent the latter from rotating with respect to the yoke 7. The threaded ends of the bolts 10—10 which extend beyond the sides of the vertical members of the yoke 1 are adapted to be engaged by the wing nuts 13—13. The middle yoke may thus be pivotally moved with respect to the yoke 1 and movement therebetween prevented by tightening the wing nuts 13—13.

The vertical members of the transverse yoke 8 which is secured to the yoke 7 are provided with the openings 14—14. An inverted yoke 15, the depending vertical sides of which are provided with the openings 16—16 is supported by the yoke 8. The yoke 15 is pivotally connected to the yoke 8 by a trunnion 17 and a bolt 18 which pass through the openings 14—14 and 16—16. The trunnion 17 is shown with a reduced end 19 which is inserted in one of the openings 14. The reduced end 19 may be brazed in the opening 14 of the yoke 8 to prevent movement therein. The head of the bolt 18 is preferably welded to the vertical member of the yoke 8 to prevent movement with respect thereto. The threaded end of the bolt 18 extends beyond the outer face of the depending vertical member of the yoke 15 and is adapted to be engaged by a washer 20 and a wing nut 21. The yoke 15 is thus adapted to move pivotally about the trunnion 17 and the bolt 18 to any desired position. The position of the yoke 15 with respect to the yoke 8 may be fixed by tightening the wing nut 21 on the bolt 18. The horizontal member of the yoke 15 has an extension 22 which has a pointer 23 formed on the upper face thereof. The lower face of the horizontal member of the yoke 15 has a plate 24 (Figure 6) secured thereto at a point substantially in alignment with the vertical axis of the adjustable support. The horizontal member of the yoke 15 and the plate 24 are provided with aligned openings and the extension 22 is provided with the threaded openings 25 and 26—26. The depending vertical member of the yoke 15 adjacent the extension 22 is provided with an opening 27. The openings 26—26 and 27 are used in connection with the modified form shown in Figure 9 and their function will be taken up in the description of the modification.

The instrument carried by the adjustable support comprises a cylindrical plate 28, the upper portion of the rim of which is set back to form a lower side 29 and an upper side 30 on the edge of the plate 28. The plate 28 is provided with an opening at the center which contains a bushing 31 (Figure 6). The upper and lower faces of the plate 28 are recessed adjacent the opening therein to receive the washers 32 and 33. A drilled shaft 34, one end of which is externally threaded and the other end of which is provided with a head 35, passes through the bushing 31 in the plate 28 and the aligned openings in the horizontal member of the yoke 15 and the plate 24. The bushing 31 rests on the washer 32 and the plate 28 is free to rotate about the shaft 34, the head 35 of which rests on the washer 33. The lower end of the shaft 34 which is externally threaded is provided with a washer 36 and a lock nut 37 which is adapted to engage the threads on the shaft 34. The lock nut 37 is provided with an operating lever 38. The plate 28 may thus be locked in any desired position by rotating the lock nut 37 with the lever 38. The drilled shaft is interiorly threaded and adapted to engage the threaded end of a luminous tipped gnomon 39. The height of the gnomon 39 above the plate 28 is controlled by screwing the rod into the shaft 34 and may be fixed by tightening the wing lock nut 40 which is adapted to engage the threaded portion of the gnomon 39. The upper face of the plate 28 is recessed to receive a liquid level 41 which is secured in place by the plate 42 and the screws 43—43. The plate 28 has an interiorly threaded bushing 44 mounted in the body thereof which is adapted to engage the threaded end of a luminous tipped sighting rod 45. The lower side 29 of the cylindrical plate 28 has an azimuth band 46 which is graduated from 0–360° in any suitable subdivisions, mounted thereon. The 0° graduation of the azimuth band 46 and the centers of the sighting rod 45 and the gnomon 39 are in alignment. The threaded opening 25 in the extension 22 of the horizontal member of the yoke 15 is adapted to engage the threaded end of an additional sighting rod which is not illustrated. The upper side 30 of the rim of the cylindrical plate 28 has the threaded pins 47—47 and a pin 48 extending therefrom. A protector strip 49 comprising a double layer of a transparent plastic material such as a cellulose derivative is provided with perforated openings near the lower edge thereof which permit the pins 47—47 and 48 to pass therethrough. The strip 49 is supported by the pins 47—47 and 48, and the upper side 30 of the rim of the plate 28. The strip 49 may be secured in place with the set screws 50—50. The protector strip 49 is adapted to receive and support a translucent film 51 which is marked with time graduations. The upper face of the cylindrical plate 28 carries a time graduated scale 52 which is protected by a transparent sheet 53. The scale 52 and the sheet 53 are secured to the plate 28 by a pair of screws 54 which are adapted to engage a pair of interiorly threaded bushings 55 mounted in the plate 28.

The time graduations on the translucent film strip 51 which is supported by the protector strips 49 are made by developing the back azimuth of the sun on a circle, the radius of which is the same as the upper portion of the cylindrical plate 28 and developing the resulting graduations on a straight line. The time graduations correspond to local watch time at the latitude and longitude of the geographical locality at which the instrument is to be used on the date the instrument is to be used. These are established by computing the corresponding local apparent time, obtaining corresponding true azimuths to the sun from a standard table of azimuths of the sun, and adding or subtracting 180 to obtain the back azimuth or the direction of the sun's shadow. This may also be accomplished by using a mechanical template or a drafting device by which the back azimuths of the sun are taken directly from standard solar plates using local apparent time, latitude and date for arguments. True north is the reference point from which the above graduations are laid off.

The time graduations on the scale 52 affixed to the upper face of the plate 28 are prepared in a manner similar to that described above for the strip 51. This scale is used only in rare cases where the shadow cast by the gnomon 39 is not long enough to reach the scale 51. If it is desired to have the instrument operate on the basis of magnetic azimuths, a new reference point is obtained. This is accomplished by laying off the local magnetic declination from the true north reference point and using the new mark as a reference point when mounting the scale 51 on the instrument. The scale 51 may be notched or perforated as indicated at 48' at the true or magnetic reference points so that the notches will fit over the pin 48.

Figures 9, 10:
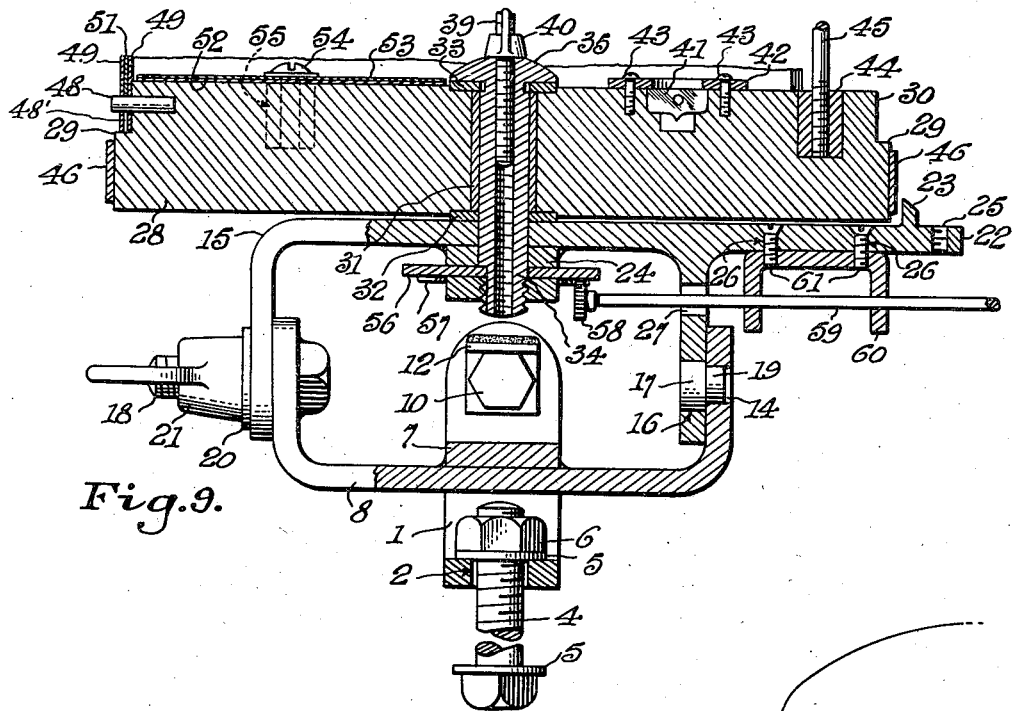
Figure 9 is a side elevational view in cross-section showing a modified form of the surveying instrument.
Figure 10 is a perspective view of the surveying instrument contemplated by this invention mounted on a vehicle and adapted for operation from the passenger compartment.

The modified form of the navigation or surveying instrument shown in Figure 9 differs in that the rotation of the cylindrical plate 28 of the instrument may be controlled from the passenger compartment of the vehicle upon which the instrument is mounted. The threaded end of the shaft 34 which extends below the plate 24 has an annular plate 56 secured thereto and is fixed with respect to plate 28. The annular plate 56 has a ring gear 57 formed on the lower face thereof which is adapted to engage the pinion 58 mounted on a shaft 59. The shaft 59 extends through the opening 27 in the depending vertical member of the yoke 15 and the openings in a guide 60 into the passenger compartment of the vehicle. The guide 60 is secured to the extension 22 to the horizontal member of the yoke 15 by means of the screws 61—61 which are adapted to engage threaded openings provided in the guide 60 and the openings 26—26 in the extension 22. The occupant of the vehicle may thus rotate the shaft 59 and in turn rotate the cylindrical plate 28. When any desired position of the plate 28 is reached, the shaft 59 may be locked in the passenger compartment to prevent further movement.

In operation, a time graduated scale 51, the markings on which correspond to local watch time of the locality in which the instrument is being used, is placed in the protector strip 49 and secured to the upper side 30 of the rim of the cylindrical plate 28 in such a manner that the notch or perforation 48' fits over the pin 48. The instrument is then leveled with respect to the surrounding terrain by adjusting the yokes 7, 8 and 15 until the liquid level indicates that the plate 28 is level. The cylindrical plate 28 may then be rotated until the magnetic or true azimuth which it is desired to establish is registered by the pointer 23 on the azimuth band 46. The plate 28 is clamped in this position by operating the lever 38 on the lock nut 37. The vehicle is then driven over the route, keeping the shadow cast by gnomon 39 at the point on the time graduated scale 51 which corresponds to the watch time of that particular locality. The transparency of the protector strips 49 and the translucency of the scale 51 enable the operator to observe the time graduations and the shadow cast by the gnomon on either face of the strip. The vehicle is thus kept on the desired azimuth without the necessity of performing calculations such as resetting a watch to allow for longitude differences from the time meridian, the equation of time or arbitrary basis of time such as "daylight saving time" or the like. It is apparent that the instrument may be operated in the reverse manner to determine the azimuth of a course between two or more successive stations. Thus, the plate 28 may be rotated until the shadow of the gnomon 39 falls on the time graduation corresponding to the local watch time. The magnetic or true azimuth of the course is given as the vehicle proceeds over the course by the indication on the azimuth band 46 by the pointer 23. In either case, the scale 52 may be used in lieu of the scale 51 when the shadow cast by the gnomon 39 is too short to reach the scale 51. When the sun is directly abeam the instrument, making reading of the position of the gnomon shadow difficult or impossible, the instrument may be moved to another point on the vehicle. A spare mounting may be provided either to the right or left of the observer to facilitate reading the instrument. A sighting rod secured in the opening 25 of the extension 22 of the yoke 15 may be used with the gnomon 39 to obtain foresights or driving marks.

In using the instrument at night, the same results may be obtained in establishing predetermined or unknown courses on the terrain. In lieu of observing the gnomon shadow, the sighting rod 45 is mounted in the bushing 44 and the gnomon 39 and the sighting rod 45, both of which are provided with luminous tips, are aligned with the North Star while the vehicle is driven over the course maintaining this alignment.

It is apparent that many different embodiments of this invention may be made without departing from the spirit and scope thereof and therefore it is not intended to be limited except as indicated in the appended claims.

Having thus described my invention, what I claim as new and wish to secure by Letters Patent is:

1. A navigation instrument comprising in combination, a rotatable plate, a gnomon mounted on said plate and a translucent vertically extending member provided with time graduation indicia and mounted on the periphery of said plate whereby the shadow of the gnomon cast by the sun upon said member may be observed from either face thereof.

2. A navigation instrument comprising in combination, a rotatable plate, a gnomon mounted on said plate, a translucent vertically extending member provided with time graduation indicia mounted on the periphery of said plate and a graduated azimuth band mounted vertically on the periphery of said plate below said translucent member, whereby the shadow of the gnomon cast by the sun upon said translucent member may be observed from either face thereof.

3. A navigation instrument comprising in combination a rotatable plate, a gnomon mounted on said plate, a translucent vertically extending member provided with time graduation indicia mounted on the periphery of said plate, an azimuth band provided with graduations of from 0°–360° mounted on the periphery of said plate, a mounting assembly for said instrument, means for clamping said plate against movement and an indicating pointer mounted on said assembly whereby the angle between the 0° mark on said azimuth band and the lubber line of the instrument may be determined.

4. A navigation instrument comprising an adjustable support adapted to be mounted on a vehicle, a cylindrical plate rotatably mounted upon said support, means to lock said plate and prevent rotation thereof, a peripheral azimuth band graduated from 0°–360° mounted on the lower edge of said plate, a pair of superimposed transparent strips mounted on the periphery of the upper edge of said plate and extending vertically above the upper face of said plate, a gnomon mounted on said plate at the center thereof, and a translucent strip bearing time graduations corresponding to the date and location near which the instrument is to be used mounted between said transparent strips, said time graduated strip being adapted to be positioned on the periphery of said plate either at a point whereby the magnetic azimuth may be obtained or at a point whereby the true azimuth may be obtained when the shadow cast by the gnomon falls on the graduation on the time graduated strip corresponding to the local watch time.

5. A navigation instrument in accordance with claim 4 characterized in that the upper face of said cylindrical plate has a segmental scale bearing time graduations corresponding to the date and location near which the instrument is to be used horizontally mounted thereon, whereby said instrument may be used when the shadow cast by the gnomon is too short to reach said vertical time graduated scale.

6. A navigation instrument in accordance with claim 4 characterized in that said adjustable support has a vertical sighting rod mounted thereon adapted to be observed in conjunction with said gnomon to sight objects on the terrain.

7. A navigation instrument in accordance with claim 4 characterized in that means are provided for rotating said cylindrical plate, said means being adapted to extend into the passenger compartment of a vehicle.

8. A navigation instrument comprising, in combination, a rotatable plate, a gnomon mounted on said plate, a translucent vertically extending member provided with time graduation indicia mounted on the periphery of said plate, a graduated azimuth band mounted vertically on the periphery of said plate below said translucent member, and an indicating pointer, said azimuth band and said translucent member being constructed and arranged on said plate whereby said pointer coincides with the graduation on said azimuth band corresponding to the azimuth of the place at which the instrument is used when the shadow of the gnomon cast by the sun falls upon the time graduation on said translucent member corresponding to the local time of said place.

9. A navigation instrument comprising a cylindrical plate, a gnomon mounted on said plate, a translucent vertically extending member provided with time graduation indicia mounted on the periphery of said plate, a graduated azimuth band mounted vertically on the periphery of said plate below said translucent member, and an adjustable support for said plate including a lower yoke adapted to be mounted on a vehicle, a pair of transversely arranged middle yokes the horizontal members of which are immovably connected, the vertical members of one of said pair of middle yokes being pivotally connected to the vertical members of said lower yoke, an upper yoke having depending vertical members pivotally connected to the vertical members of the other of said pair of middle yokes, an extension formed on the horizontal member of said upper yoke, a pointer for indicating the azimuth mounted on the upper face of said extension, and a shaft rotatably mounted on the horizontal member of said upper yoke, said cylindrical plate being mounted on said shaft.

WILLIAM S. LITTLE.

REFERENCES CITED

The following references are of record in the file of this patent:

UNITED STATES PATENTS

| Number | Name | Date |
| --- | --- | --- |
| 978,093 | Weule | Dec. 6, 1910 |

FOREIGN PATENTS

| Number | Country | Date |
| --- | --- | --- |
| 537,924 | British | July 14, 1941 |
| 22,513 | British | Sept. 28, 1910 |